United States Patent
Muquit et al.

(10) Patent No.: US 8,238,616 B2
(45) Date of Patent: Aug. 7, 2012

(54) BIOMETRIC AUTHENTICATION SYSTEM AND BIOMETRIC AUTHENTICATION METHOD

(75) Inventors: Mohammad Abdul Muquit, Tokyo (JP); Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 422 days.

(21) Appl. No.: 12/638,516

(22) Filed: Dec. 15, 2009

(65) Prior Publication Data

US 2010/0158323 A1    Jun. 24, 2010

(30) Foreign Application Priority Data

Dec. 16, 2008    (JP) ................ P2008-320221

(51) Int. Cl.
*G06K 9/00* (2006.01)
*G06F 21/00* (2006.01)
*G06F 7/04* (2006.01)

(52) U.S. Cl. ........ 382/115; 382/118; 382/305; 713/186; 726/2

(58) Field of Classification Search .................. 382/115, 382/118, 125, 128, 129, 190, 209, 305; 713/155, 713/176, 168, 186, 185; 705/2, 3, 35, 75; 726/2, 5, 26, 27; 719/313, 315, 318, 328
See application file for complete search history.

(56) References Cited

U.S. PATENT DOCUMENTS

| | | | |
|---|---|---|---|
| 7,114,074 B2 * | 9/2006 | Alasia et al. | 713/176 |
| 7,333,637 B2 * | 2/2008 | Walfridsson | 382/124 |
| 7,400,749 B2 * | 7/2008 | Hillhouse | 382/124 |
| 7,773,792 B2 * | 8/2010 | Kimmel et al. | 382/128 |
| 7,797,549 B2 * | 9/2010 | Main et al. | 713/186 |
| 8,028,330 B2 * | 9/2011 | Fujii et al. | 726/5 |
| 2004/0104266 A1 * | 6/2004 | Bolle et al. | 235/382 |

FOREIGN PATENT DOCUMENTS

| | | |
|---|---|---|
| JP | 62-125483 | 6/1987 |
| JP | 2004-13504 | 1/2004 |
| JP | 2004-362186 | 12/2004 |

* cited by examiner

*Primary Examiner* — Sheela Chawan
(74) *Attorney, Agent, or Firm* — Finnegan, Henderson, Farabow, Garrett & Dunner, L.L.P.

(57) ABSTRACT

There is provided a biometric authentication system including a plurality of information processing devices divided to a first group for performing a primary authentication based on feature quantity information unique to a biological pattern of a user associated with biological information, and specifying an identification number assigned to the user, and a second group for performing a secondary authentication on the biological information that succeeded in the primary authentication based on the identification number and registered biological information registered in advance. The input biological information is transmitted to all information processing devices belonging to the first group, the biological information that succeeded in the primary authentication is added as queuing information to a queue, and each of the information processing devices belonging to the second group acquires the queuing information positioned at a head of the queue when the secondary authentication process being executed in the own device is terminated.

6 Claims, 10 Drawing Sheets

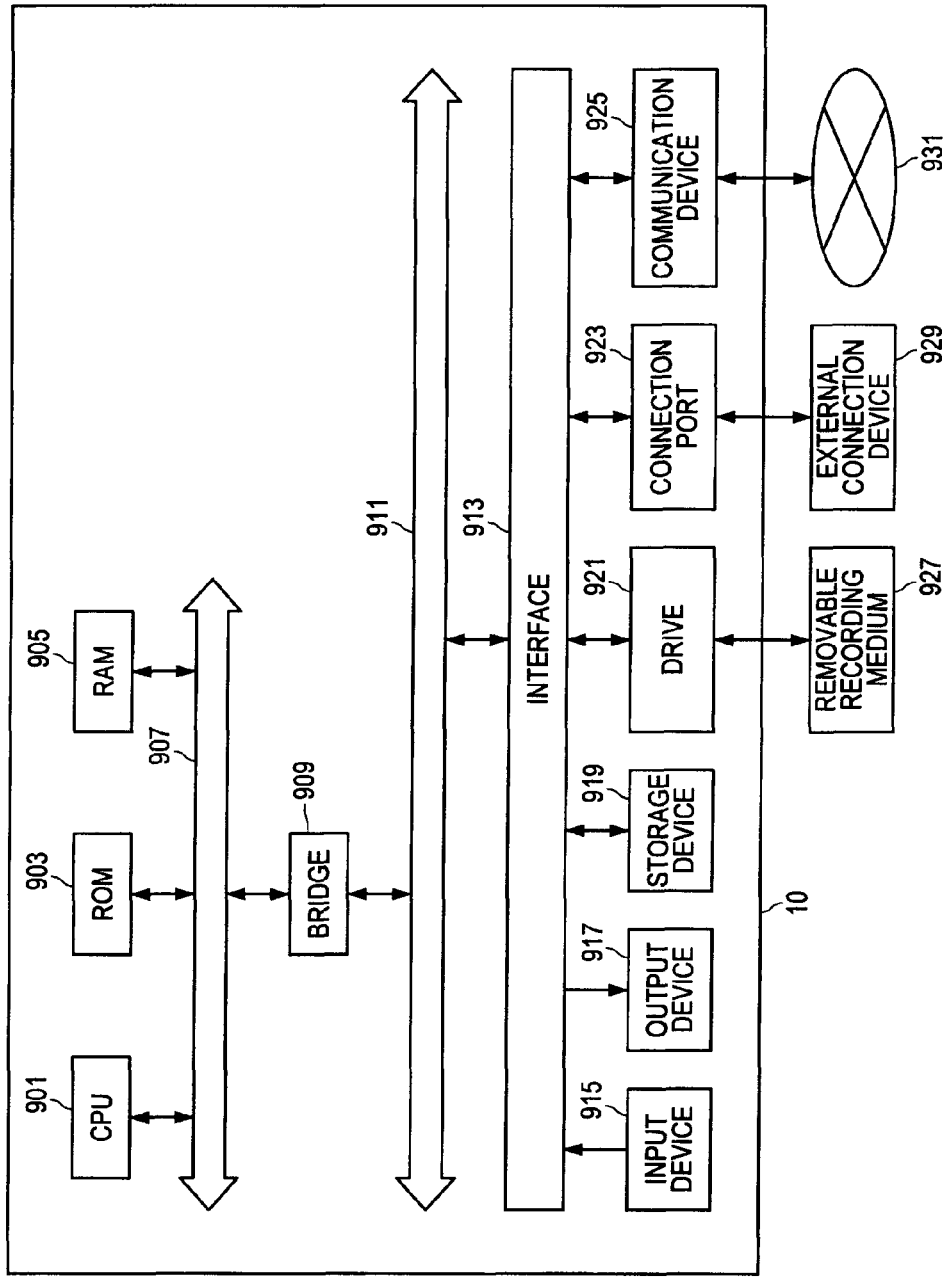

BIOMETRIC AUTHENTICATION SYSTEM AND BIOMETRIC AUTHENTICATION METHOD

BACKGROUND OF THE INVENTION

1. Field of the Invention

The present invention relates to a biometric authentication system and a biometric authentication method.

2. Description of the Related Art

In the related art, a plurality of registering information is registered in the memory and the like, and whether the person who input the information that matches the registered registering information is the registered person is searched as in a system for managing entering/exit of a certain location, and the like. In this case, a so-called "one to N authentication" in which the input information to be authenticated is matched with each of a plurality of registering information registered in the memory and the like is performed.

In the one to N authentication, N in the one to N authentication is less likely to be a large number in a case of a system using one sensor such as in security application of an information appliances such as a personal computer and a portable telephone, and a managing of entering and exiting to a small-scale office, and the length of the authentication time does not become an issue.

For instance, in the entering and exiting control, the office where a few dozen people are working can be sufficiently responded even under a setting where only one person can simultaneously enter and exit the room using one sensor installed outside the door. In entering and exiting, the registered person inputs a biological image such as his/her finger vein image, fingerprint image, face image, and iris image. The computer installed in the office performs the one to N authentication between all registered data being held and the input data, and determines whether or not to allow entering to the room. If the number N of registered person is few, the number of data to compare is small, and thus the authentication process can be easily executed without keeping the registered person waiting. In the case of the notebook-sized personal computer, the portable telephone, and the like, the one to N authentication can be executed without affecting the convenience of the registered person by having the user register a plurality of fingers in advance in the case such as the vein authentication and the fingerprint authentication.

However, if a large-scale biometric authentication system is necessary, the N of the one to N authentication becomes large, and the authentication time for one input becomes enormously long. Furthermore, if offices are on plural floors in the same building, a plurality of sensors is installed and the authentication process is sometimes performed with respect to plural people simultaneously or within a very small time. Thus, if the data of all registered person is managed with one device, the authentication time with respect to one person becomes long and the queue with long authentication process wait occurs. This is not a preferable state for both the registered person entering and exiting the room and for the entire system.

In such system, image data referred to as a template is used for the registering information, and the authentication time can be shortened if the speed of the matching process of comparing such template and the input information can be increased. In Japanese Patent Application Laid-Open No. 2004-362186 described below, a method (so-called one-dimensional parallelization of parallelizing in the direction of number of jobs) of dividing the matching process into a number of jobs and sequentially parallel processing the divided jobs is disclosed to shorten the time for the matching process.

SUMMARY OF THE INVENTION

However, the method described in Japanese Patent Application Laid-Open No. 2004-362186 has an issue in that the authentication time may not be shortened if a plurality of inputs is simultaneously made since parallelization is carried out only in the direction of number of jobs.

In light of the foregoing, it is desirable to provide a novel and improved biometric authentication system and a biometric authentication method capable of shortening the authentication time even if a plurality of inputs is simultaneously made.

According to an embodiment of the present invention, there is provided a biometric authentication system, including a plurality of information processing devices for performing authentication using biological information corresponding to a biological pattern representing physical features of a user. The plurality of information processing devices is divided into a first group for performing a primary authentication based on feature quantity information unique to the biological pattern representing the physical features of the user associated with the biological information, and specifying an identification number assigned to the user and a second group for performing a secondary authentication on the biological information that succeeded in the primary authentication based on the identification number and registered biological information registered in advance. The input biological information is transmitted to all the information processing devices belonging to the first group. The biological information that succeeded in the primary authentication is added as queuing information to a queue waiting for the start of the secondary authentication. Each of the information processing devices belonging to the second group acquires the queuing information positioned at a head of the queue and executes a secondary authentication process when the secondary authentication process being executed in the own device is terminated.

The second group may be further divided into a thumbnail authentication group for performing authentication on the biological information that succeeded in the primary authentication based on a thumbnail image of a registered biological pattern registered in advance and a template authentication group for performing authentication on the biological information that succeeded in the thumbnail authentication based on a template, which is the registered biological pattern registered in advance. The biological information that succeeded in the thumbnail authentication group may be added as queuing information to a queue waiting for the start of the authentication based on the template. Each of the information processing devices belonging to the template authentication group may acquire the queuing information positioned at a head of the queue and execute an authentication process based on the template when the authentication process based on the template being executed in the own device is terminated.

Number of information processing devices belonging to each group may preferably be determined so that a time for execution of the primary authentication in each information processing device belonging to the first group, a time for execution of the authentication based on the thumbnail image in each information processing device belonging to the thumbnail authentication group, and a time for execution of the authentication based on the template in each information processing device belonging to the template authentication group are equal to each other.

When number of users whose registered biological information is registered may be N and number of information processing devices belonging to the first group may be A, each information processing device belonging to the first group may preferably hold the registered biological information for (N/A) people different from each other.

When number of information processing devices belonging to the thumbnail authentication group may be B, and number of information processing devices belonging to the template authentication group may be C, a ratio of the number of information processing devices belonging to the first group and the number of information processing devices belonging to the thumbnail authentication group may preferably be set to satisfy equation 1, and a ratio of the number of information processing devices belonging to the thumbnail authentication group and the number of information processing devices belonging to the template authentication group may preferably be set to satisfy equation 2.

$$\frac{A}{B} = \frac{N \cdot t_1}{N_2 \cdot t_2} \quad \text{(Equation 1)}$$

$$\frac{B}{C} = \frac{N_2 \cdot t_2}{N_3 \cdot t_3} \quad \text{(Equation 2)}$$

In equation 1 and equation 2,
$N_2$: number of biological information passing the information processing device belonging to the first group and becoming the queuing information,
$N_3$: number of biological information passing the information processing device belonging to the thumbnail authentication group and becoming the queuing information,
$t_1$: time for execution of the primary authentication in the information processing devices belonging to the first group,
$t_2$: time for execution of the authentication based on the thumbnail image in the information processing devices belonging to the thumbnail authentication group, and
$t_3$: time for execution of the authentication based on the template in the information processing devices belonging to the template authentication group.

According to another embodiment of the present invention, there is provided a biometric authentication method, including the steps of transmitting biological information input to a biometric authentication system, which includes a plurality of information processing devices for performing authentication using biological information or information corresponding to a biological pattern representing physical features of a user, the plurality of information processing devices being divided into a first group for performing the primary authentication based on feature quantity information unique to the biological pattern representing the physical features of the user associated with the biological information, and specifying an identification number assigned to the user, and a second group for performing a secondary authentication on the biological information that succeeded in the primary authentication based on the identification number and registered biological information registered in advance, to all the information processing devices belonging to the first group and performing the primary authentication, having the information processing device belonging to the first group add the biological information that succeeded in the primary authentication as queuing information to a queue waiting for the start of the secondary authentication, and having each of the information processing devices belonging to the second group acquire the queuing information positioned at a head of the queue and execute a secondary authentication process when the secondary authentication process being executed in the own device is terminated.

According to the embodiments of the present invention, the authentication time can be shortened even if plural inputs are simultaneously made since the biometric authentication process is parallelized not only in the direction of number of jobs but also in the direction of number of registered data.

BRIEF DESCRIPTION OF THE DRAWINGS

FIG. 10 is a block diagram for describing a hardware configuration of an input device arranged in the vein authentication system according to each embodiment of the present invention.

DETAILED DESCRIPTION OF THE EMBODIMENTS

Figure 1:
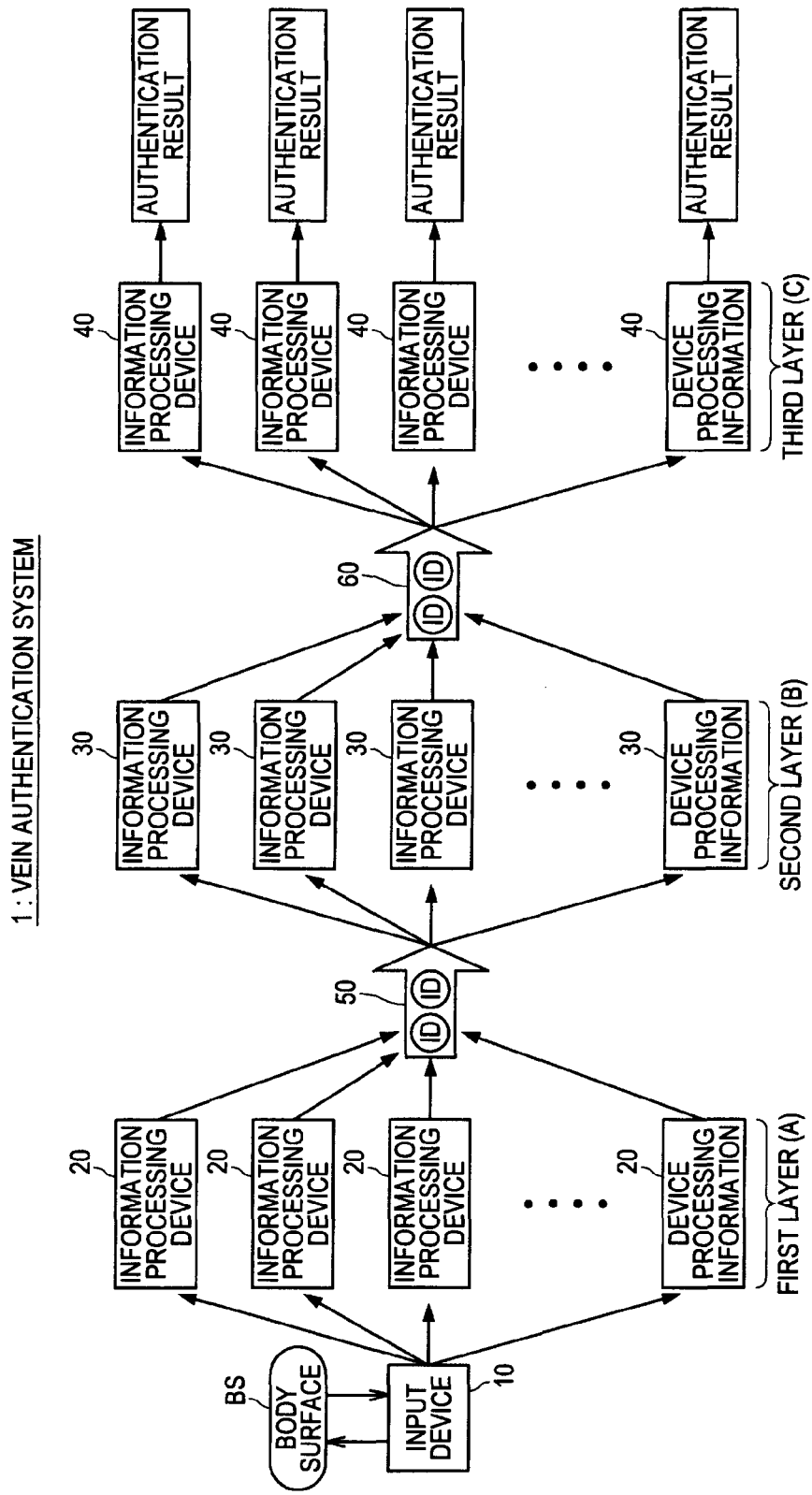
FIG. 1 is an explanatory view for describing a vein authentication system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In the following description, the vein authentication will be described as an example of the biometric authentication. The present invention, however, is not limited thereto, and may be applied to various other biometric authentications such as fingerprint authentication, face authentication, and iris authentication.

Figure 2:
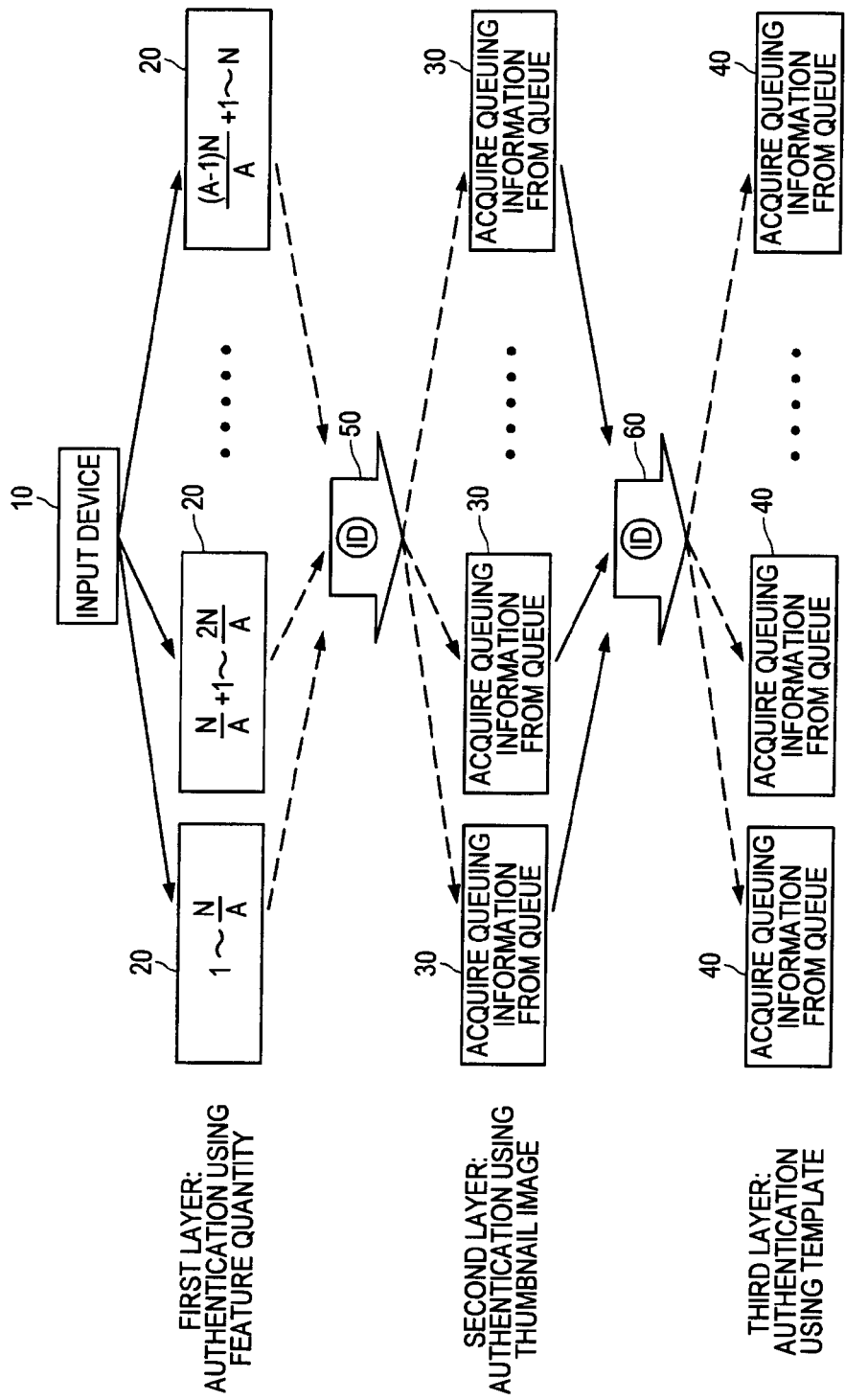
FIG. 2 is an explanatory view for describing a vein authentication system according to the embodiment.

The description will be made in the following order.
(1) First Embodiment
  (1-1) Regarding outline of vein authentication system
  (1-2) Regarding configuration of input device
  (1-3) Regarding configuration of information processing device
    Information processing device belonging to first layer
    Information processing device belonging to second layer
    Information processing device belonging to third layer (1-4) Regarding details of vein authentication system
(1-5) Regarding vein authentication method
(2) Regarding hardware configuration of each device arranged in vein authentication system according to each embodiment of the present invention
(3) Summary First Embodiment Regarding Outline of Vein Authentication System First, the outline of the vein authentication system according to a first embodiment of the present invention will be described in detail with reference to FIG. 1 and FIG. 2. FIG. 1 and FIG. 2 are explanatory views for describing the vein authentication system according to the present embodiment.

As shown in FIG. 1, the vein authentication system 1 according to the present embodiment includes an input device 10 and a plurality of information processing devices.

A body surface BS of a finger and the like is placed over the input device 10 by a user of the vein authentication system 1. The input device 10 extracts a pattern of the vein existing inside the body surface BS, and generates vein information used in the vein authentication process. The input device 10 also generates feature quantity information, which is information related to the feature quantity unique to the vein pattern of the user. The input device 10 transmits the generated vein information and the feature quantity information to the plurality of information processing devices, to be hereinafter described.

The information processing device performs authentication of the user using the vein information, which is information representing the vein pattern of the user. In the vein authentication system 1 according to the present embodiment, the plurality of information processing devices is broadly divided into two types of groups as hereinafter described. The first group is a group to which the information processing device for performing a primary authentication based on the feature quantity information and specifying a unique identification number assigned to the user belongs. The second group is a group to which the information processing device for performing a secondary authentication on the vein information that succeeded in the primary authentication based on the identification number and the registered vein information registered in advance belongs.

In the example shown in FIG. 1 and FIG. 2, A information processing devices 20 belonging to the first layer are an information processing device group belonging to the first group. B information processing devices 30 belonging to the second layer and C information processing devices 40 belonging to the third layer are an information processing device group belonging to the second group.

As shown in FIG. 2, the second group may be configured by two more types of groups. One group is a thumbnail authentication group for performing authentication on the vein information that succeeded in the primary authentication based on the thumbnail image of the registered vein pattern registered in advance. The other group is a template authentication group for performing authentication on the vein information that succeeded in the thumbnail authentication based on the template or the registered vein pattern registered in advance.

In the example shown in FIG. 1 and FIG. 2, B information processing devices 30 belonging to the second layer are the information processing device group belonging to the thumbnail authentication group. C information processing devices 40 belonging to the third layer are the information processing device group belonging to the template authentication group.

A queue 50 is set between the first layer and the second layer, and a queue 60 is set between the second layer and the third layer.

Prior to describing the vein authentication system 1 according to the present embodiment in detail, the configuration of the input device 10 and the information processing devices 20, 30, 40 belonging to each layer will be first described in detail below.

Regarding Configuration of Input Device

Figure 3:
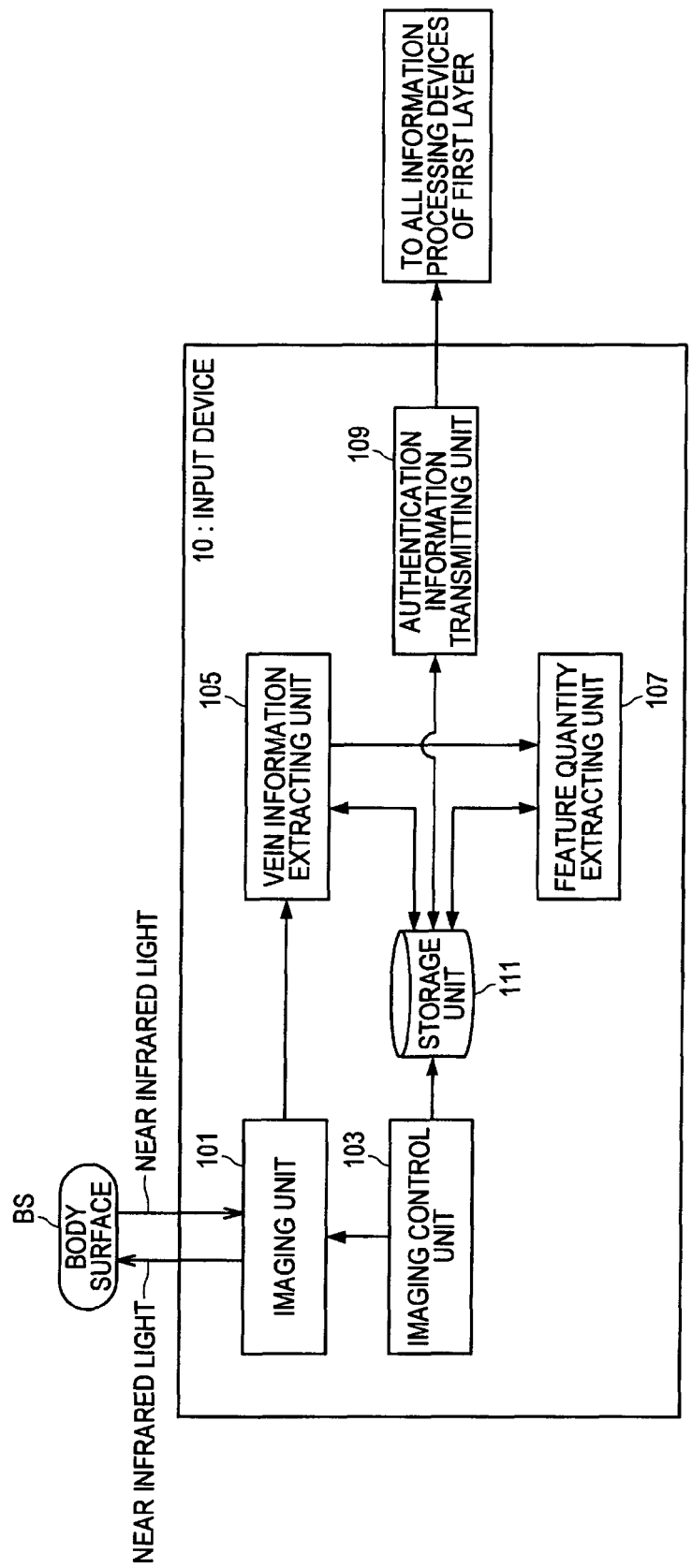
FIG. 3 is a block diagram for describing a configuration of an input device arranged in the vein authentication system according to the embodiment.

First, the configuration of the input device 10 arranged in the vein authentication system 1 according to the present embodiment will be described in detail with reference to FIG. 3. FIG. 3 is a block diagram for describing the configuration of the input device 10 according to the present embodiment.

As shown in FIG. 3, the input device 10 according to the present embodiment is configured to mainly include an imaging unit 101, an imaging control unit 103, a vein information extracting unit 105, a feature quantity extracting unit 107, an authentication information transmitting unit 109, and a storage unit 111.

The imaging unit 101 includes a light source unit for irradiating a near infrared light having a predetermined wavelength band with respect to the body surface BS, and an optical system configured by optical elements such as an imaging element and a lens.

The near infrared light has a property of having high transmissivity with respect to the body tissue and being absorbed to hemoglobin (reduced hemoglobin) in the blood, and thus the vein distributed inside the finger, the palm, and the back of the hand appears in the image as a shade when the near infrared light is irradiated on the finger, the palm, and the back of the hand. The shade of the vein that appears in the image is referred to as a vein pattern. The light source unit of the light emitting diode, and the like irradiates a near infrared light having a wavelength of between about 600 nm and 1300 nm and preferably between about 700 nm and 900 nm to satisfactorily image such vein pattern.

If the wavelength of the near infrared light irradiated by the light source unit is smaller than 600 nm or greater than 1300 nm, the percentage of being absorbed by the hemoglobin in the blood becomes small, and thus satisfactory vein pattern becomes difficult to obtain. If the wavelength of the near infrared light irradiated by the light source unit is between about 700 nm and 900 nm, the near infrared light is specifically absorbed with respect to both deoxygenization hemoglobin and oxygenization hemoglobin, and thus a satisfactory vein pattern may be obtained.

The near infrared light exit from the light source unit is propagated towards the body surface BS, and enters inside from the side surface and the like of the living body as a direct light. Since the human body is a scattering body of the satisfactory near infrared light, the direct light that entered inside the living body propagates while scattering to four sides. The near infrared light that transmitted through the living body enters the optical element configuring the optical system.

The optical system configuring the imaging unit 101 is configured by one or a plurality of optical elements, and one or a plurality of imaging elements.

The skin of the human body is known to have a three-layer structure including an epidermic layer, a dermic layer, and a subcutaneous tissue layer, where the vein layer in which the vein exists is in the dermic layer. The dermic layer is a layer that exists at a thickness of between about 2 mm and 3 mm from the position of between about 0.1 mm and 0.3 mm with respect to the finger surface. Therefore, the transmitted light that transmitted through the vein layer can be efficiently collected by setting the focal position of the optical element such as the lens at an existing position (e.g., position of between about 1.5 mm and 2.0 mm from the finger surface) of the dermic layer.

The transmitted light transmitted through the vein layer that is collected by the optical element is imaged by the imaging element such as CCD and CMOS to become vein imaging data. The generated vein imaging data is transmitted to the vein information extracting unit 105, to be hereinafter described.

The imaging control unit 103 is configured by central processing unit (CPU), read only memory (ROM), random access memory (RAM), and the like. The imaging control unit 103 controls the optical system and the imaging element, and generates the imaging data.

The imaging control unit 103 causes the imaging data generated by the imaging element to be output to the vein information extracting unit 105, to be hereinafter described. The imaging control unit 103 may also record the obtained imaging data in the storage unit 111, to be hereinafter described. In recordation to the storage unit 111, the imaging control unit 103 may associate the imaging date, the imaging time, and the like with the generated imaging data. The imaging data to be generated may be an red-green-blue (RGB) signal, or may be image data of other colors or gray scale.

The vein information extracting unit 105 is configured by CPU, ROM, RAM, and the like, and extracts the vein information, which is information representing the vein pattern of the user, from the near infrared imaging data transmitted from the imaging unit 101. The vein information extracting unit 105 further includes processing units such as image smoothening unit, contour extracting unit, mask image generating unit, cutout unit, vein smoothening unit, binarization unit, heavy line unit, thin line unit, and thumbnail image generating unit.

The image smoothening unit is configured by CPU, ROM, RAM, and the like. The image smoothening unit performs filtering on the vein imaging data provided from the imaging control unit 103 as an imaging result using a spatial filter called Gaussian filter, for example, and smoothens the vein image corresponding to the vein imaging data.

The contour extracting unit is configured by CPU, ROM, RAM, and the like. The contour extracting unit performs filtering on the vein image smoothed by the image smoothening unit using a spatial filter called Laplacian of Gaussian (Log) filter, for example, and emphasizes and relieves the contour in the vein image.

The mask image generating unit is configured by CPU, ROM, RAM, and the like. The mask image generating unit detects the contour line such as the finger contour based on the contrast with the background portion from the vein image in which the contour is emphasized by the contour extracting unit. The mask image generating unit generates an image (hereinafter also referred to as mask image) indicating a finger region surrounded by the detected contour line and other regions by binarization.

The cutout unit is configured by CPU, ROM, RAM, and the like. The cutout unit cuts out an image of a predetermined size containing the finger region surrounded by the finger contour using the mask image generated by the mask image generating unit from the vein image in which the contour is emphasized by the contour extracting unit.

The vein smoothening unit is configured by CPU, ROM, RAM, and the like. The vein smoothening unit performs filtering on the vein image cut out by the cutout unit using a spatial filter called a median filter, for example, and smoothens the vein portion in the vein image.

The binarization unit converts the vein image in which the vein portion is smoothened by the vein smoothening unit to a binary level with a set luminance level as a reference. If the vein image before the vein is smoothed is used as an image to be binarized, the probability that the vein, which is actually one vein, is separated into two veins by binarization becomes high. Therefore, the binarization can be performed in a state close to the actual vein by using the vein image in which the vein is smoothed as the target of binarization.

The heavy line unit performs filtering on the vein image binarized by the binarization unit using a spatial filter called a dilation filter, for example, and indicates the vein contained in the vein image with a heavy line. As a result, the disconnected vein area, although it is a vein area that is originally connected, can be connected.

The thin line unit performs filtering on the vein image in which the vein portion is indicated with a heavy line by the heavy line unit using a spatial filter called an erosion filter so that the vein width of the vein portion is constant.

The thumbnail image generating unit is configured by CPU, ROM, RAM, and the like. The thumbnail image generating unit acquires the vein image indicating the vein portion having a constant vein width and the background portion by binarization from the thin line unit, and generates a thumbnail image, which is an image in which the vertical and horizontal size is compressed to 1/n times, from the vein image.

The vein information extracting unit 105 extracts the image in which the vein portion having a constant vein width and the background portion are indicated by binarization as the vein information in the above manner. The vein information extracting unit 105 transmits the extracted vein information and the thumbnail image, and various types of information generated by each processing unit of the vein information extracting unit 105 to the feature quantity extracting unit 107, to be hereinafter described. The vein information extracting unit 105 also transmits the extracted vein information and the thumbnail image to the authentication information transmitting unit 109, to be hereinafter described. The vein information extracting unit 105 may record the extracted vein information and the thumbnail image, and various types of information generated by each processing unit of the vein information extracting unit 105 in the storage unit 111, to be hereinafter described.

The feature quantity extracting unit 107 is configured by CPU, ROM, RAM, and the like. The feature quantity extracting unit 107 extracts the feature quantity information, which is information related to the feature quantity unique to the vein pattern of the user, based on the vein information and various types of information transmitted from the vein information extracting unit 105. The feature quantity unique to the vein pattern of the user includes a thumbnail image of an image representing the vein pattern or the vein information, information related to the contour of one part (e.g., finger) of the body, information related to the luminance distribution of the vein image, and information related to blood vessel amount of the vein image. The feature quantity extracting unit 107 further includes a contour shape extracting unit, a frequency distribution extracting unit, a blood vessel amount extracting unit, and the like.

The contour shape extracting unit is configured by CPU, ROM, RAM, and the like. The contour shape extracting unit extracts information representing the contour shape of one part (e.g., finger) of the body using the vein image generated at the noise component removing stage.

One specific example of the extracting method will be described. The contour shape extracting unit acquires the mask image from the mask image generating unit, and cuts out a specific region including one part of the finger contour (pixels configuring the finger frame) from the acquired mask image.

Thereafter, the contour shape extracting unit compresses the specific region so that the vertical and horizontal size becomes 1/n times, and extracts the position of the finger contour (pixels configuring the finger frame) contained in the compressed specific region as a coordinate value (x coordinate value) indicating the distance from the reference (e.g., left end) in the specific region.

The frequency distribution extracting unit is configured by CPU, ROM, RAM, and the like. The frequency distribution extracting unit extracts information representing the frequency distribution of a living body region surrounded by the contour of one part of the body such as finger using the vein image generated at the noise component removing stage.

One specific example of the extracting method will be described. The frequency distribution extracting unit acquires the smoothened vein image from the image smoothening unit, and acquires the mask image from the mask image generating unit.

The frequency distribution extracting unit recognizes the region (e.g., finger region) corresponding to the portion of the body using the mask image from the smoothened vein image, and extracts number of pixels for every set luminance class from the region corresponding to the portion of the body.

The blood vessel amount extracting unit is configured by CPU, ROM, RAM, and the like. The blood vessel amount extracting unit extracts information representing the vein amount in the region surrounded by the contour of one part of the body such as finger using the vein image generated at the heavy line stage of the vein in the binarized image. One specific example of the extracting method will be described. The blood vessel amount extracting unit acquires the binarized vein image in which the vein is indicated with heavy line from the heavy line unit, and extracts information representing the number of pixels (blood vessel amount) configuring the vein from the vein image.

The feature quantity extracting unit 107 transmits the information representing the contour shape, the information representing the frequency distribution, and the information representing the blood vessel amount to the authentication information transmitting unit 109, to be hereinafter described. The feature quantity extracting unit 107 may also record the information representing the contour shape, the information representing the frequency distribution, and the information representing the blood vessel amount in the storage unit 111, to be hereinafter described.

The authentication information transmitting unit 109 is configured by CPU, ROM, RAM, communication device, and the like. The authentication information transmitting unit 109 obtains the authentication information by associating the vein information and the thumbnail image transmitted from the vein information extracting unit 105, and the information representing the contour shape, the information representing the frequency distribution, and the information representing the blood vessel amount transmitted from the feature quantity extracting unit 107 with each other. The authentication information transmitting unit 109 also stores authentication information in order in the stack arranged in the authentication information transmitting unit 109 based on the generation time of the generated authentication information. When receiving a notification that the primary authentication being processed has terminated from the information processing device 20 group belonging to the first layer, the authentication information transmitting unit 109 transmits the stored authentication information with the earliest generation time to all the information processing devices 20 belonging to the first layer.

The storage unit 111 appropriately records various parameters, intermediate steps of the process, and the like to be saved when the input device 10 according to the present embodiment performs some kind of process, or various types of databases, and the like. The storage unit 111 may be freely read out or written to by the imaging unit 101, the imaging control unit 103, the vein information extracting unit 105, the feature quantity extracting unit 107, the authentication information transmitting unit 109, and the like.

The user of the vein authentication system 1 according to the present embodiment can record, in advance, the vein information, the thumbnail image, the information related to various types of feature quantities, and the like using a device having functions similar to the vein information extracting unit 105 and the feature quantity extracting unit 107 of the input device 10 according to the present embodiment.

One example of the functions of the input device 10 according to the present embodiment has been described. Each configuring elements described above may be configured using a general-purpose member or circuit, or may be configured by hardware specialized to the function of each configuring element. All the functions of each configuring element may be carried out by the CPU and the like. Therefore, the configuration to use can be appropriately changed according to the technical level at the time of implementing the present embodiment.

A computer program for realizing each function of the input device according to the present embodiment may be created, and mounted in a personal computer etc. equipped with the imaging unit. A computer readable recording medium storing such computer program is also provided. The recording medium may be a magnetic disc, an optical disc, a magneto-optical disc, a flash memory, or the like. The computer program may be distributed through the network without using the recording medium.

Regarding Configuration of Information Processing Device

Figure 4:
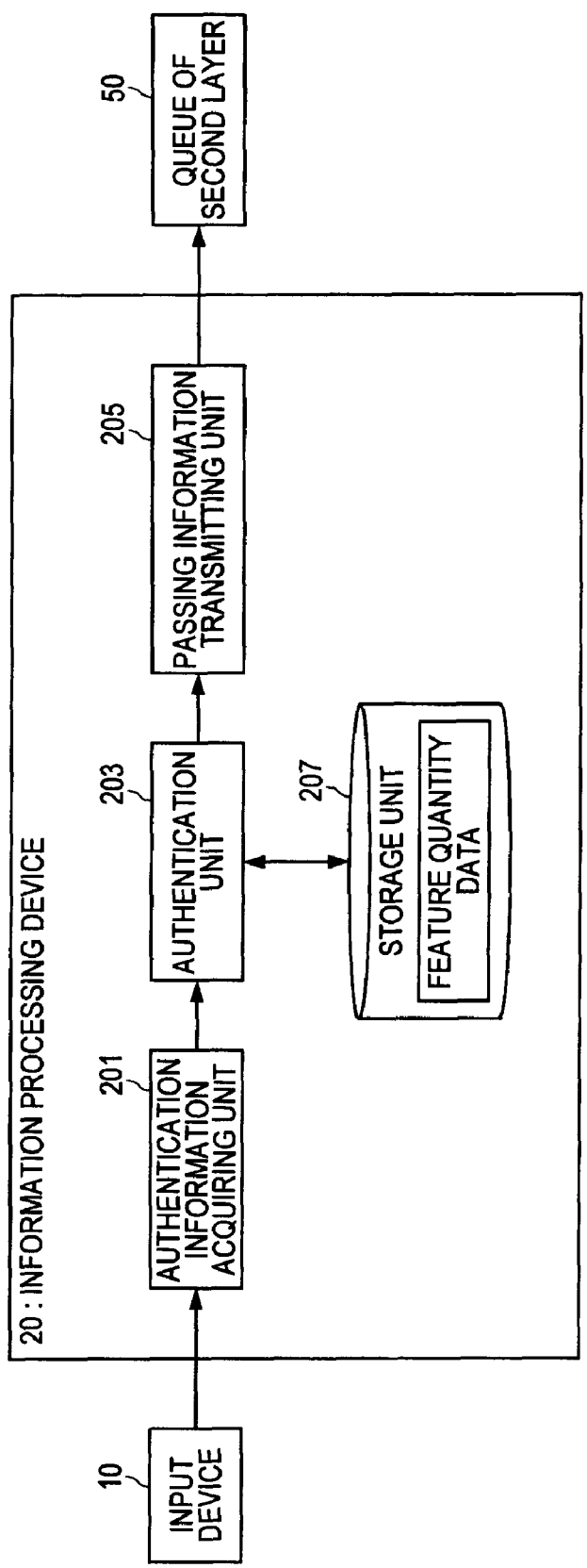
FIG. 4 is a block diagram for describing a configuration of an information processing device arranged in the vein authentication system according to the embodiment.
Figure 5:
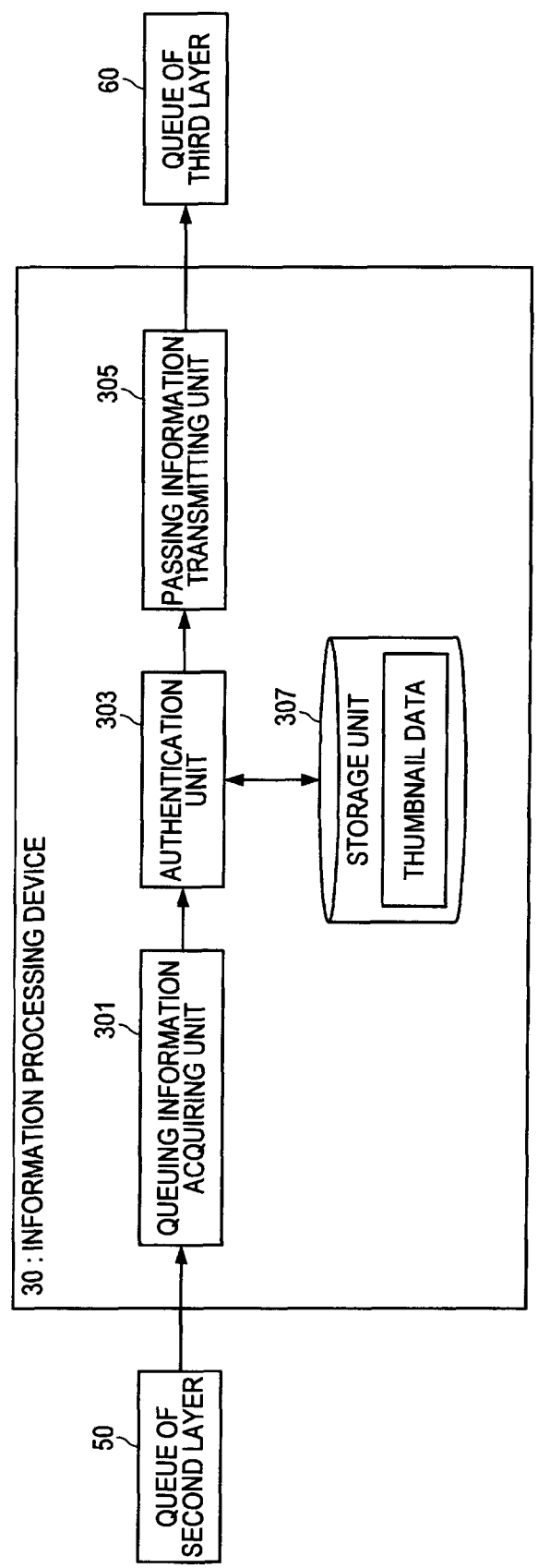
FIG. 5 is a block diagram for describing a configuration of an information processing device arranged in the vein authentication system according to the embodiment.
Figure 6:
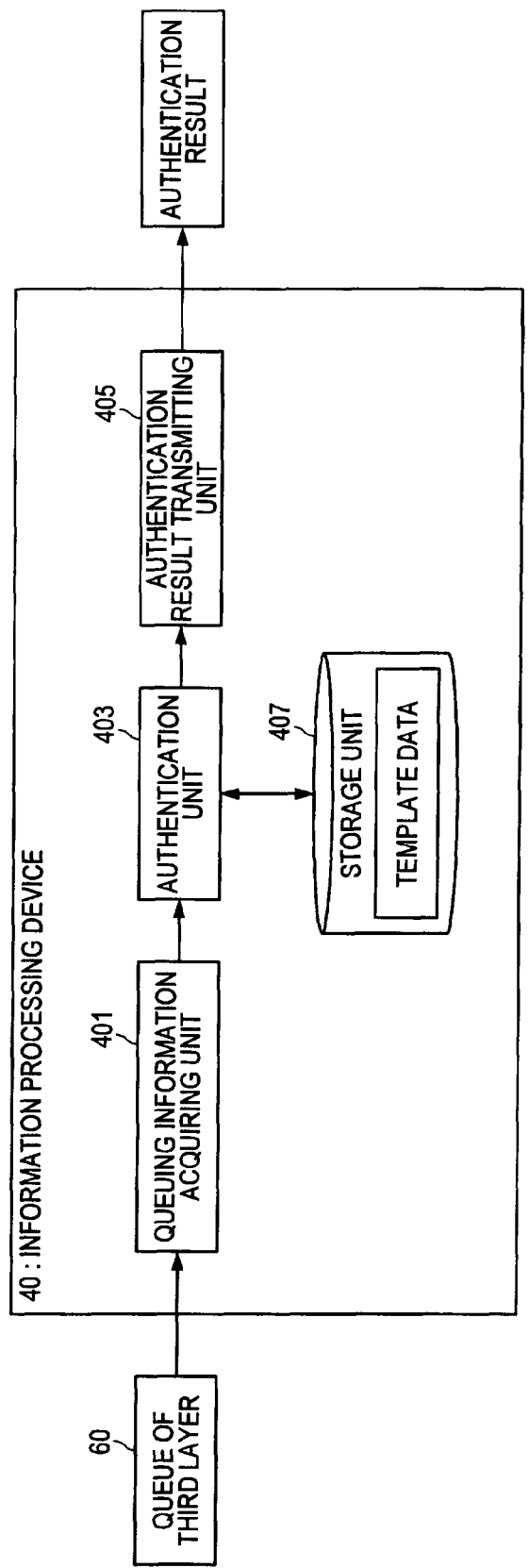
FIG. 6 is a block diagram for describing a configuration of an information processing device arranged in the vein authentication system according to the embodiment.

The configuration of the information processing device according to the present embodiment will be described in detail with reference to FIGS. 4 to 6. FIGS. 4 to 6 are block diagrams for describing the configuration of the information processing device arranged in the vein authentication system according to the present embodiment.

Information Processing Device 20 Belonging to First Layer

First, the configuration of the information processing device 20 belonging to the first layer will be described in detail with reference to FIG. 4.

As shown in FIG. 4, the information processing device 20 belonging to the first layer mainly includes an authentication information acquiring unit 201, an authentication unit 203, a passing information transmitting unit 205, and a storage unit 207.

The authentication information acquiring unit 201 is configured by CPU, ROM, RAM, and the like. The authentication information acquiring unit 201 requests the input device 10 to transmit the authentication information when the primary authentication process currently being performed in the information processing device 20 is terminated and the passing information is transmitted to the queue 50, to be hereinafter described. When new authentication information is transmitted from the input device 10, the authentication information acquiring unit 201 acquires the transmitted authentication information, and transmits the information to the authentication unit 203, to be hereinafter described.

The authentication unit 203 is configured by CPU, ROM, RAM, and the like. The authentication unit 203 references the database described with information related to the feature quantity of the registered person stored in the storage unit 207, to be hereinafter described, to perform the primary authentication process on the feature quantity contained in the authentication information. The information related to the feature quantity includes information related to the contour shape, information related to the frequency distribution, and information related to the blood vessel amount, as described above. The authentication unit 203 may perform the primary authentication process using one of the information representing such feature quantities, or may perform the primary authentication process using plural pieces of information representing the feature quantity.

The authentication unit 203 determines that the primary authentication of the transmitted authentication information has succeeded when the similarity of the information representing the feature quantity registered in advance to the own device and the information representing the feature quantity contained in the transmitted authentication information is equal to or greater than a predetermined threshold value as a result of the authentication process. Only one part of the registered data of the registered person registered to the vein authentication system 1 is stored in the information processing device 20 belonging to the first layer, as hereinafter described. Thus, if the information representing the corresponding feature quantity does not exist in the database stored in the own device, the authentication unit 203 determines that the authentication has failed. However, the information representing the feature quantity of a legitimate registered person exists in any one of the information processing devices 20 belonging to the first layer. Thus, determination that any one of the information processing devices 20 belonging to the first layer has succeeded in authentication is made if the person is a legitimate registered person.

When the feature quantity that succeeded in the primary authentication process exists, the authentication unit 203 references the database of the corresponding feature quantity, and acquires an identification number (ID) of the registered person recorded in association with such feature quantity. Thereafter, the authentication unit 203 obtains the passing information by associating the authentication information containing the feature quantity that succeeded in the primary authentication and the acquired identification number (ID) with each other, and transmits the information to the passing information transmitting unit 205, to be hereinafter described.

The passing information transmitting unit 205 is configured by CPU, ROM, RAM, communication device, and the like. The passing information transmitting unit 205 transmits the passing information transmitted from the authentication unit 203 to the queue 50 arranged between the first layer and the second layer as queuing information. After transmitting the passing information to the queue 50, the passing information transmitting unit 205 requests the authentication information acquiring unit 201 to acquire new authentication information from the input device 10.

Only one part of the registered data of the registered person registered to the vein authentication system 1 is stored as the feature quantity database in the storage unit 207. The storage unit 207 appropriately records various parameters, intermediate steps of the process, and the like to be saved when the information processing device 20 according to the present embodiment performs some kind of process, or various types of databases, and the like. The storage unit 207 may be freely read out or written to by the authentication information acquiring unit 201, the authentication unit 203, the passing information transmitting unit 205, and the like.

One example of the functions of the information processing device 20 according to the present embodiment has been described. Each configuring elements described above may be configured using a general-purpose member or circuit, or may be configured by hardware specialized to the function of each configuring element. All the functions of each configuring element may be carried out by the CPU and the like. Therefore, the configuration to use can be appropriately changed according to the technical level at the time of implementing the present embodiment.

A computer program for realizing each function of the information processing device 20 according to the present embodiment may be created, and mounted in a personal computer etc. A computer readable recording medium storing such computer program is also provided. The recording medium may be a magnetic disc, an optical disc, a magneto-optical disc, a flash memory, or the like. The computer program may be distributed through the network without using the recording medium.

[Information Processing Device 30 Belonging to Second Layer]

First, the configuration of the information processing device 30 belonging to the second layer will be described in detail with reference to FIG. 5.

As shown in FIG. 5, the information processing device 30 belonging to the second layer mainly includes a queuing information acquiring unit 301, an authentication unit 303, a passing information transmitting unit 305, and a storage unit 307.

The queuing information acquiring unit 301 is configured by CPU, ROM, RAM, and the like. The queuing information acquiring unit 301 acquires the queuing information from the head of the queue 50 when the thumbnail authentication process currently being performed in the device is terminated and the passing information is transmitted to the queue 60, to be hereinafter described, and transmits the queuing information to the authentication unit 303, to be hereinafter described.

The authentication unit 303 is configured by CPU, ROM, RAM, and the like. The authentication unit 303 references the database described with information related to the thumbnail image of the registered person stored in the storage unit 307, to be hereinafter described, to perform the thumbnail authentication process on the queuing information transmitted from the queuing information acquiring unit 301. Since the queuing information is associated with the identification number (ID) of the registered person by the information processing device 20 belonging to the first layer, the information processing device 30 belonging to the second layer can search the database based on the associated identification number (ID).

The authentication unit 303 determines that the thumbnail authentication has succeeded when the similarity of the data related to the thumbnail image recorded in the database the device holds and the thumbnail image contained in the transmitted queuing information is equal to or greater than a predetermined threshold value as a result of the authentication process.

The authentication unit 303 transmits the queuing information that succeeded in the thumbnail authentication process to the passing information transmitting unit 305, to be hereinafter described, as the passing information that succeeded in authentication.

The passing information transmitting unit 305 is configured by CPU, ROM, RAM, communication device, and the like. The passing information transmitting unit 305 transmits the passing information transmitted from the authentication unit 303 to the queue 60 arranged between the second layer and the third layer as queuing information. After transmitting the passing information to the queue 60, the passing information transmitting unit 305 requests the queuing information acquiring unit 301 to acquire new queuing information from the queue 50.

The storage unit 307 stores the registered data (in particular, data related to thumbnail image) of the registered person registered to the vein authentication system 1 as the database. The storage unit 307 appropriately records various parameters, intermediate steps of the process, and the like to be saved when the information processing device 30 according to the present embodiment performs some kind of process, or various types of databases, and the like. The storage unit 307 may be freely read out or written to by the queuing information acquiring unit 301, the authentication unit 303, the passing information transmitting unit 305, and the like.

One example of the functions of the information processing device 30 according to the present embodiment has been described. Each configuring elements described above may be configured using a general-purpose member or circuit, or may be configured by hardware specialized to the function of each configuring element. All the functions of each configuring element may be carried out by the CPU and the like. Therefore, the configuration to use can be appropriately changed according to the technical level at the time of implementing the present embodiment.

A computer program for realizing each function of the information processing device 30 according to the present embodiment may be created, and mounted in a personal computer etc. A computer readable recording medium storing such computer program is also provided. The recording medium may be a magnetic disc, an optical disc, a magneto-optical disc, a flash memory, or the like. The computer program may be distributed through the network without using the recording medium.

[Information Processing Device 40 Belonging to Third Layer]

First, the configuration of the information processing device 40 belonging to the third layer will be described in detail with reference to FIG. 6.

As shown in FIG. 6, the information processing device 40 belonging to the third layer mainly includes a queuing information acquiring unit 401, an authentication unit 403, an authentication result transmitting unit 405, and a storage unit 407.

The queuing information acquiring unit 401 is configured by CPU, ROM, RAM, and the like. The queuing information acquiring unit 401 acquires the queuing information from the head of the queue 60 when the template authentication process currently being performed in the device is terminated and the information related to the authentication result is transmitted, and transmits the queuing information to the authentication unit 403, to be hereinafter described.

The authentication unit 403 is configured by CPU, ROM, RAM, and the like. The authentication unit 403 references the database described with information related to the template image of the registered person stored in the storage unit 407, to be hereinafter described, to perform the template authentication process on the queuing information transmitted from the queuing information acquiring unit 401. Since the queuing information is associated with the identification number (ID) of the registered person by the information processing device 20 belonging to the first layer, the information processing device 40 belonging to the third layer can search the database based on the associated identification number (ID).

The authentication unit 403 determines that the template authentication has succeeded when the similarity of the data related to the template image recorded in the database the device holds and the vein information (i.e., template image) contained in the transmitted queuing information is equal to or greater than a predetermined threshold value as a result of the authentication process.

The authentication unit 403 transmits the queuing information that succeeded in the template authentication process to the authentication result transmitting unit 405, to be hereinafter described.

The authentication result transmitting unit 405 is configured by CPU, ROM, RAM, communication device, and the like. When acquiring the notification that the template authentication has succeeded from the authentication unit 403, the authentication result transmitting unit 405 notifies the authentication result to the outside of the information processing device 40. When the transmission of the authentication result is terminated, the authentication result transmitting unit 405 requests the queuing information acquiring unit 401 to acquire new queuing information from the queue 60.

The storage unit 407 stores the registered data (in particular, data related to template image) of the registered person registered to the vein authentication system 1 as the database. The storage unit 407 appropriately records various parameters, intermediate steps of the process, and the like to be saved when the information processing device 40 according to the present embodiment performs some kind of process, or various types of databases, and the like. The storage unit 407 may be freely read out or written to by the queuing information acquiring unit 401, the authentication unit 403, the authentication result transmitting unit 405, and the like.

One example of the functions of the information processing device 40 according to the present embodiment has been described. Each configuring elements described above may be configured using a general-purpose member or circuit, or may be configured by hardware specialized to the function of each configuring element. All the functions of each configuring element may be carried out by the CPU and the like. Therefore, the configuration to use can be appropriately changed according to the technical level at the time of implementing the present embodiment.

A computer program for realizing each function of the information processing device 40 according to the present embodiment may be created, and mounted in a personal computer etc. A computer readable recording medium storing such computer program is also provided. The recording medium may be a magnetic disc, an optical disc, a magneto-optical disc, a flash memory, or the like. The computer program may be distributed through the network without using the recording medium.

Regarding Details of Vein Authentication System

Returning back to FIGS. 1 and 2, the details of the vein authentication system 1 will be described in detail.

In each information processing device 20 belonging to the first layer of the vein authentication system 1 according to the present embodiment, the registered data related to some of the registered people registered to the present vein authentication system is stored. If the number of registered people registered to the present vein authentication system 1 is N, and the number of information processing devices 20 belonging to the first layer is A, the registered data worth (N/A) is stored in each information processing device 20, for example, as shown in FIG. 2. In other words, the database corresponding to the identification number of the user of first to $(N/A)^{th}$ is stored in the first information processing device 20. Similarly, the database corresponding to the identification number of the user of $(N/A)+1^{st}$ to $(2N/A)^{th}$ is stored in the second information processing device 20. The database corresponding to $\{N\cdot(A-1)\}/A^{th}$ to $N^{th}$ is stored in the $A^{th}$ information processing device 20.

The authentication information imaged and generated by the input device 10 is transmitted to all information processing devices 20 belonging to the first layer. If the user requesting for the authentication process is a legitimate registered person, the primary authentication is successful in any one of the information processing device 20 of A information processing devices 20. The authentication information that passed the information processing device 20 belonging to the first layer is input to the queue 50 installed between the first layer and the second layer as queuing information. The information processing device 20 acquires new authentication information from the input device 10 after transmitting the queuing information to the queue 50.

The information processing device 30 belonging to the second layer transmits the information that passed the thumbnail authentication to the queue 60 installed between the second layer and the third layer as queuing information when the thumbnail authentication process performed in the own device is terminated. At the same time, the information processing device 30 acquires the queuing information positioned at the head of the queue 50 in order, and executes the thumbnail authentication process on the acquired queuing information.

Similarly, the information processing device 40 belonging to the third layer outputs the authentication result to an externally arranged device when the template authentication process performed in the own device is terminated. At the same time, the information processing device 40 acquires the queuing information positioned at the head of the queue 60 in order, and executes the template authentication process on the acquired queuing information.

The vein authentication system 1 according to the present embodiment can simultaneously process plural user data through a so-called pipeline method by performing such process.

Here, the total processing time in each layer is preferably equal to each other in the vein authentication system 1 according to the present embodiment. Thus, the number of information processing devices in each layer is determined based on the processing time for every unit ID (i.e., every one authentication information) of each layer and the total number of IDs to be processed.

Assume that one user inputs the finger vein image to the input device 10 at the time point of time T. Assume that the number of registered people being registered is N, and $N_2$ authentication data is passed to the second layer on average from the information processing device 20 belonging to the first layer. The average number of data may be based on statistical estimation, or may be an average value in the system. Assume that $N_3$ data is passed to the third layer on average of the $N_2$ data passed through the first layer. The processing time for the first layer to the third layer with respect to one authentication data is $t_1$, $t_2$, $t_3$.

In this case, the ratio of the number A of information processing devices 20 belonging to the first layer and the number B of information processing devices 30 belonging to the second layer is set such that the processing time in each layer becomes equal. In other words, the number A of information processing devices 20 and the number B of information processing devices 30 satisfy the following equation 101.

$$\frac{N}{A}\cdot t_1 = \frac{N_2}{B}\cdot t_2 \qquad \text{(Equation 101)}$$

Deforming the equation 101, the ratio of the number A of information processing devices 20 and the number B of information processing devices 30 satisfy the relationship expressed with the following equation 102.

$$\frac{A}{B} = \frac{N\cdot t_1}{N_2\cdot t_2} \qquad \text{(Equation 102)}$$

Similarly, the ratio of the number B of information processing devices 30 belonging to the second layer and the number C of information processing devices 40 belonging to the third layer is set such that the processing time in each layer becomes equal. As a result, the number B of information processing devices 30 and the number C of information processing devices 40 satisfy the following equation 103.

$$\frac{B}{C} = \frac{N_2\cdot t_2}{N_3\cdot t_3} \qquad \text{(Equation 103)}$$

The vein authentication system 1 shown in FIGS. 1 and 2 will be described below using specific numbers by way of example.

For instance, assume the management of entering and exiting of 10000 people. In this case, the database includes N=10000 registered data sets, where the entering is permitted if the input data succeeds in authentication with any of the data in the database in input. The registered data set refers to a data set in which the authentication number of the user, the vein information, the thumbnail image, the information related to the contour shape, the information related to the frequency distribution, and the information related to the blood vessel amount are associated with each other.

In the vein authentication system, a simple one to N authentication due to matching of feature quantity data (thumbnail image, information related to contour shape, information related to frequency distribution, information related to blood vessel amount, etc.) is performed in the information processing device group belonging to the first layer. The primary authentication process is consequently performed on all 10000 data sets by the information processing device group belonging to the first layer, and only the data set satisfying a predetermined condition is determined to have high similarity to the input data. As a result, the information processing device 20 belonging to the first layer transmits the ID and the authentication information associated with the information determined to have high similarity to the queue 50 arranged before the second layer.

Here, assume that one matching takes 0.01 msec in the first layer, and ten information processing devices 20 are arranged in the first layer. In this case, each information processing device 20 is responsible for 1000 authentication information and can perform the process in 10 msec. At the time point the process started in the first layer, one queue 50 is prepared before the second layer. The ID that passed each information processing device 20 of the first layer is immediately input to the queue 50 to the second layer. Therefore, the process in the second layer starts at the time point the first ID is sent from the first layer. The process in the first layer terminates in a constant time (10 msec in the above example) regardless of the order of ID of the input individual.

Assume that 2500 passing information are sent on average to the second layer from the first layer. In the second layer, the thumbnail authentication of 2500 times is performed using the queue method. If the thumbnail authentication of one time takes 0.2 msec, 50 information processing devices 30 are desired in the second layer to enable the thumbnail authentication to be performed on 2500 authentication information in 10 msec.

The authentication information is sent from the second layer to the third layer in the queue method for authentication (actual authentication) of the vein information using the template. Assume that the average number of authentication information that is sent is 20, and the actual authentication of one time takes 5 msec. In this case, 10 information processing devices 40 are desired to perform the actual authentication on 20 authentication information in 10 msec.

Therefore, to have the total processing time of each layer the same, the number of information processing devices classified to each layer is determined with reference to the processing time for every unit authentication information of each layer and the total number of authentication information to be processed in the present vein authentication system 1. If the time for the process in each layer is the same, the command waiting time in the information processing device reduces when a plurality of users uses the system in the pipeline method. The waiting time of the command in the information processing device will be described below.

Figure 7:
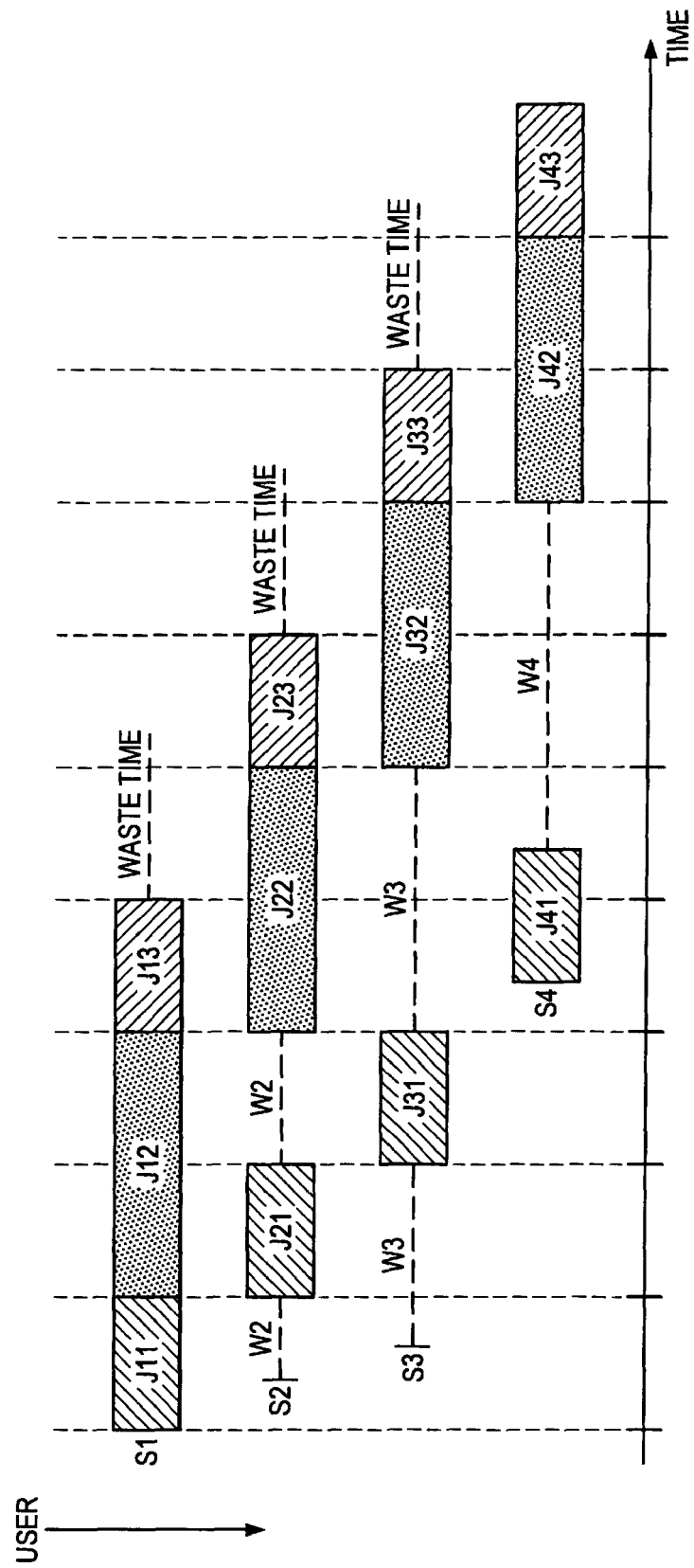
FIG. 7 is an explanatory view for describing the standby time in a pipeline process.
Figure 8:
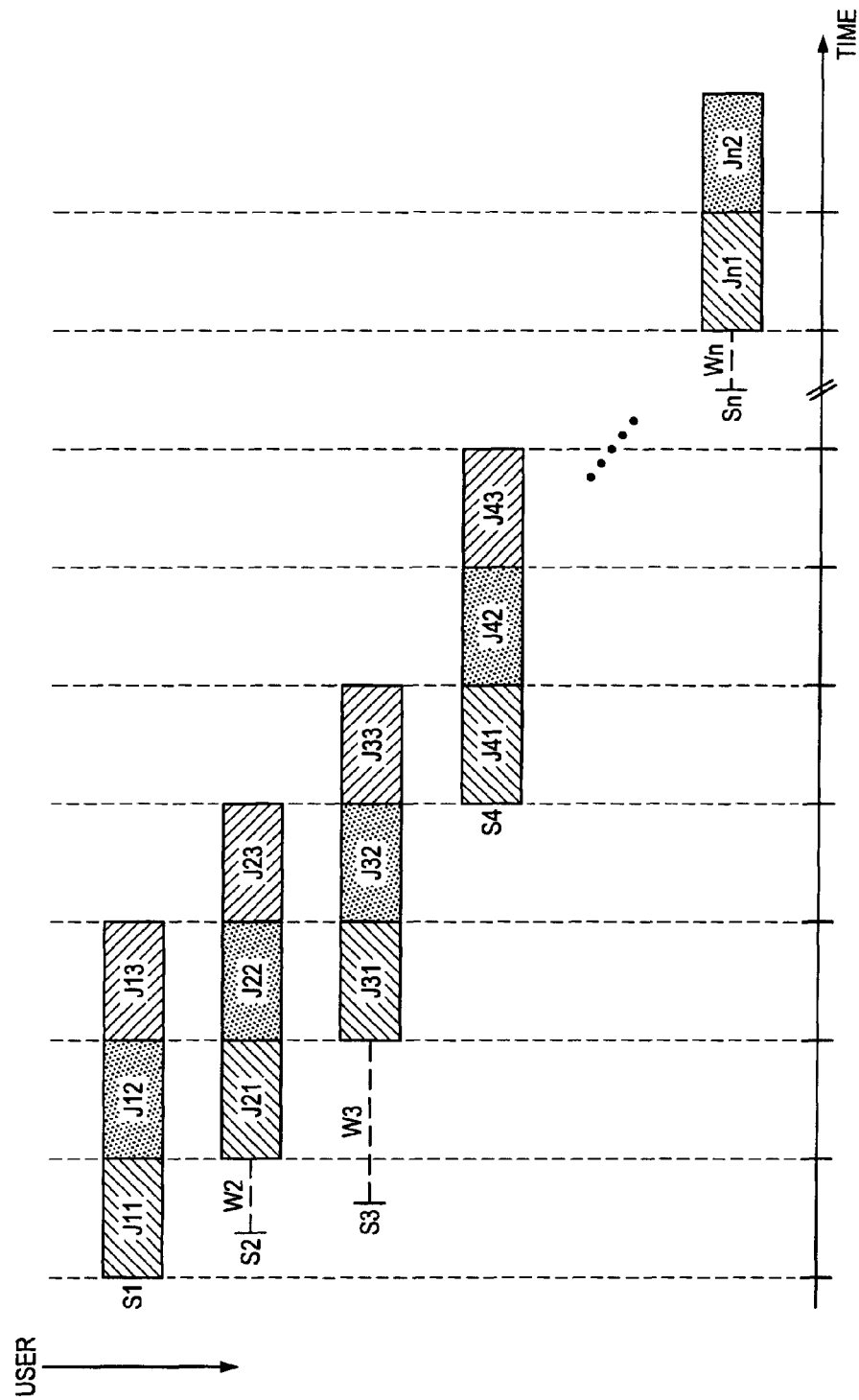
FIG. 8 is an explanatory view for describing the standby time in the pipeline process according to the embodiment.

Subsequently, the waiting time of the command in the vein authentication system according to the present embodiment will be described in detail with reference to FIGS. 7 and 8. FIG. 7 is an explanatory view for describing the standby time in the pipeline process, and FIG. 8 is an explanatory view for describing the standby time in the pipeline process according to the present embodiment.

When performing the entering and exiting control to plural floors of the building using a large-scale system such as the same database, a plurality of sensors is installed in each floor, and the user inputs data through the respective sensor. In this case, a case in which a plurality of users inputs his/her biological information through different sensors at the same time or in a microscopic time occurs. In such case, each process in each layer is performed through the pipeline method in the vein authentication system 1 according to the present embodiment. That is, the start of the authentication process regarding the person who input the biological information is not after the entire authentication process with respect to the previous person is terminated but at the time point the process in the first layer with respect to the previous person is terminated.

First, the symbols used in FIGS. 7 and 8 will be described. In FIGS. 7 and 8, the vertical axis represents the input order of the user who input the biological information from top to bottom, and the horizontal axis represents the times. Here, Si (i=1, 2, ..., n) represents the time point the $i^{th}$ user inputs the biological information to the sensor. As shown in FIGS. 7 and 8, the process or the job performed on each user is displayed in three stages. Each process is represented with an alphabet J, where Jik represents the process (job) of the $k^{th}$ layer with respect to the $i^{th}$ user. The length in the horizontal direction of the rectangle representing each process refers to the processing time corresponding to each process. Furthermore, Wi represents the waiting time of the $i^{th}$ user, and the broken line corresponding to each Wi represents the length of the waiting time.

In FIG. 7, a case in which the processing time of the job Ji2 of the second layer is long compared to the jobs in other layers is illustrated. In this case, with respect to the user 2, the waiting time to the start of process in the second layer occurs, and due to the influence thereof, the information processing device 40 of the third layer does not perform any process for a certain time before starting J23 after the job of J13 is terminated. That is, a waste time in which the information processing device 40 does not execute any process occurs. As apparent from FIG. 7, the needless waiting time occurs with respect to the user 3 and the user 4 in chain reaction when the waiting time occurs with respect to the user 2. To eliminate such waste time, the vein authentication system is built such that the total calculation time per one person in each layer is the same in the vein authentication system 1 according to the present embodiment.

FIG. 8 shows the pipeline method in the vein authentication system 1 according to the present embodiment. In the example shown in FIG. 8, the user 2 immediately after inputs the biological information before the process of the first layer with respect to the user 1 is finished. Thus, the waiting time of the user 2 is from when the user 2 makes an input until the process of the first layer with respect to the user 1 is finished. The user 3 inputs the biological information before the process with respect to the user 2, which is a person immediately before, starts. Thus, the waiting time of the user 3 becomes long. On the other hand, the user 4 inputs the biological information after the process of the first layer with respect to the user 3 immediately before is finished. Thus, the waiting time is 0 (zero) for the user 4.

In the vein authentication system 1 according to the present embodiment, the system simultaneously performs the processes (e.g., J13, J22, J31 in FIG. 8) with respect to a plurality of users to enhance the efficiency of the entire system by applying the pipeline method. As apparent from FIG. 8, the maximum value of the processing time difference of the user that made the input $i^{th}$ and the user that made the input $i+1^{th}$ becomes max (Ji1, Ji2, Ji3, J(i+1)1, J(i+1)2, J(i+1)3). Therefore, the processing time of Ji1, Ji2, Ji3 is made to the same length to minimize the waiting time between the jobs in each user. The number of information processing devices in each layer is set so as to obtain such processing time, whereby the authentication time in the entire system can be reduced.

Regarding Vein Authentication Method

Figure 9:
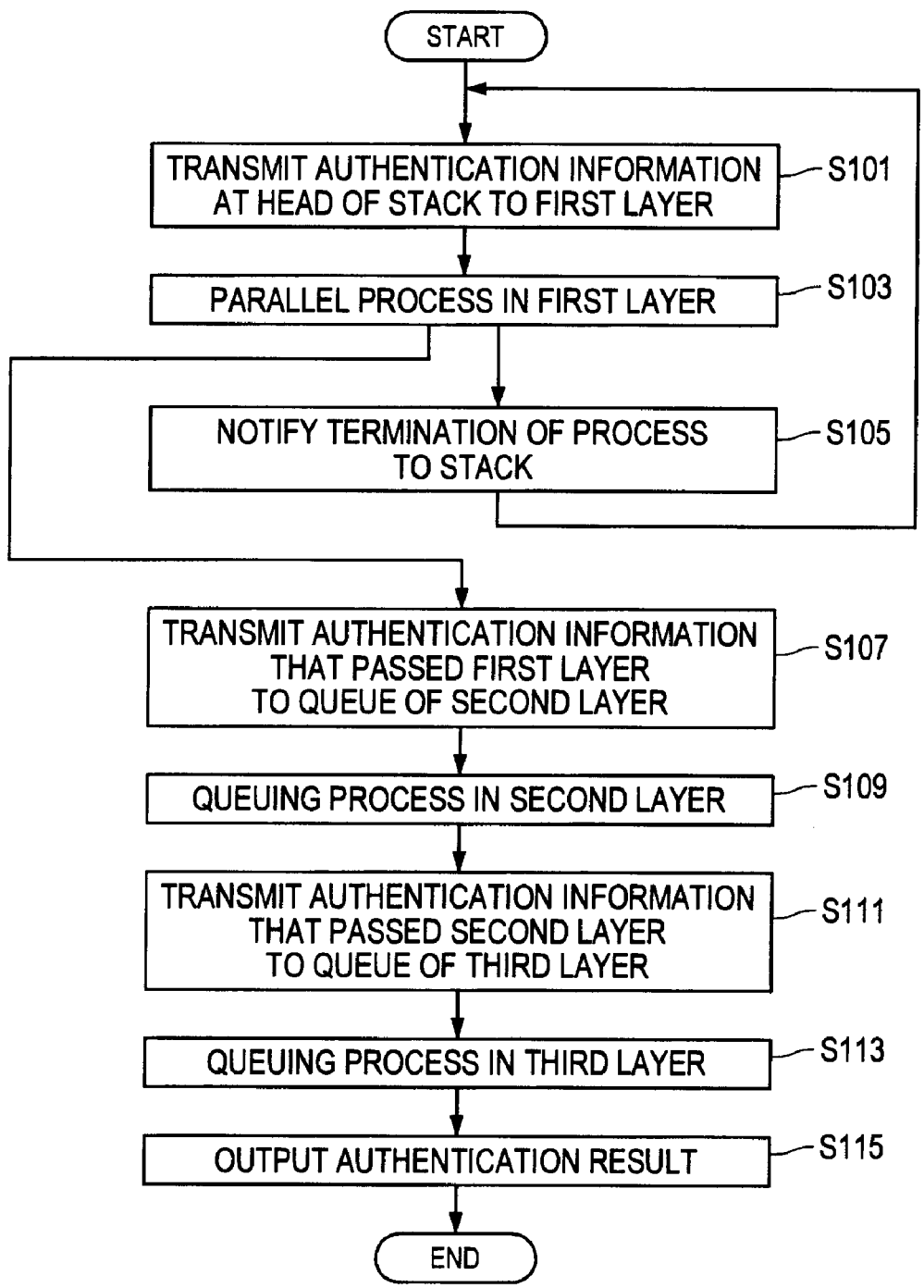
FIG. 9 is a flowchart for describing a vein authentication method according to the embodiment.

The vein authentication method performed in the vein authentication system 1 according to the present embodiment will be described in detail with reference to FIG. 9. FIG. 9 is a flowchart for describing the vein authentication method performed in the vein authentication system according to the present embodiment.

In the following description, the user of the vein authentication system 1 is assumed to have already input the biological information through the input device 10.

The authentication information waiting to be transmitted to the information processing device 20 belonging to the first layer is stored in order in the stack arranged in the authentication information transmitting unit 109 of the input device 10 in association with the created time etc. of the authentication information. When notification that the primary authentication process is terminated is transmitted from the information processing device 20 belonging to the first layer, the authentication information transmitting unit 109 transmits the authentication information positioned at the head of the stack to all information processing devices 20 belonging to the first layer (step S101).

Each information processing device 20 belonging to the first layer that acquired the authentication information performs the authentication (primary authentication) based on the feature quantity with respect to the transmitted authentication information by parallel processing (step S103). After the primary authentication based on the feature quantity is terminated, the passing information transmitting unit 205 of the information processing device 20 notifies the stack of the input device 10 of the fact that the primary process is terminated (step S105). The passing information transmitting unit 205 of the information processing device 20 also transmits the authentication information that passed the first layer to the queue 50 of the second layer arranged between the first layer and the second layer (step S107) as the queuing information.

In the information processing device 30 belonging to the second layer, the authentication process (thumbnail authentication process) by the queue method is performed (step S109). More specifically, when the thumbnail authentication process performed in the own device is terminated, each information processing device 30 belonging to the second layer acquires the queuing information positioned at the head of the queue 50 of the second layer, and performs the thumbnail authentication process on the acquired queuing information. After the thumbnail authentication process is terminated, the information processing device 30 belonging to the second layer transmits the authentication information that passed the second layer to the queue 60 of the third layer arranged between the second layer and the third layer (step S111) as the queuing information.

In the information processing device 40 belonging to the third layer, the authentication process (template authentication process) by the queue method is performed (step S113). More specifically, when the template authentication process performed in the own device is terminated, each information processing device 40 belonging to the third layer acquires the queuing information positioned at the head of the queue 60 of the third layer, and performs the template authentication process on the acquired queuing information. After the template authentication process is terminated, the authentication result transmitting unit 405 of the information processing device 40 belonging to the third layer transmits the authentication result (step S115).

The vein authentication system 1 according to the present embodiment can simultaneously process plural user data with the so-called pipeline method by performing such process.

Regarding Hardware Configuration

The hardware configuration of the input device 10 according to each embodiment of the present invention will be described in detail below with reference to FIG. 10. FIG. 10 is a block diagram for describing the hardware configuration of the input device 10 according to each embodiment of the present invention.

The input device 10 is configured to mainly include a CPU 901, a ROM 903, and a RAM 905. The input device 10 also includes a host bus 907, a bridge 909, an external bus 911, an interface 913, an input device 915, an output device 917, a storage device 919, a drive 921, a connection port 923 and a communication device 925.

The CPU 901 functions as a calculation processing device and a control device, and controls all or some of the operations of the input device 10 according to various types of programs recorded in the ROM 903, the RAM 905, the storage device 919, or a removable recording medium 927. The ROM 903 stores programs, calculation parameters, and the like used by the CPU 901. The RAM 905 primary stores programs used in the execution of the CPU 901, parameters that appropriately change in the relevant execution, and the like. These components are mutually connected by the host bus 907 configured by an internal bus such as a CPU bus.

The host bus 907 is connected to the external bus 911 such as peripheral component interconnect/interface (PCI) bus by way of the bridge 909.

The input device 915 is an operation means operated by the user such as a mouse, a keyboard, a touch panel, a button, a switch, and a lever. The input device 915 may be, for example, a remote control means (so-called remote controller) using infrared light or other electric waves, or may be an external connection device 929 such as a portable telephone and a PDA corresponding to the operation of the input device 10. Furthermore, the input device 915 is configured by an input control circuit for generating an input signal based on the information input by the user using the operation means, and outputting to the CPU 901. The user of the input device 10 operates the input device 915 to input various types of data to the input device 10 and instruct the processing operation.

The output device 917 is configured by a device capable of visually or aurally notifying the user of the acquired information. Such device includes a display device such as a CRT display device, a liquid crystal display device, a plasma display device, an EL display device, and a lamp, an audio output device such as a speaker and a headphone, a printer device, a portable telephone, a facsimile, and the like. The output device 917 outputs the result obtained through various types of processes performed by the input device 10. Specifically, the display device displays the result obtained through various types of processes performed by the input device 10 in text or in image. On the other hand, the audio output device converts an audio signal including the reproduced audio data and the acoustic data to an analog signal, and outputs the same.

The storage device 919 is a device for data storage configured as one example of a storage unit of the input device 10. The storage device 919 is configured by a magnetic storage device such as an hard disc drive (HDD), a semiconductor storage device, an optical storage device, or a magneto-optical storage device. The storage device 919 stores programs and various types of data executed by the CPU 901, various types of data acquired from the outside, and the like.

The drive 921 is a recording medium reader/writer, and is incorporated in or externally attached to the input device 10. The drive 921 reads out information recorded on the removable recording medium 927 such as a magnetic disc, optical disc, magneto-optical disc, or semiconductor memory that is attached, and outputs the information to the RAM 905. The drive 921 may also write recording to the removable recording medium 927 such as a magnetic disc, optical disc, magneto-optical disc, or semiconductor memory that is attached. The removable recording medium 927 is a DVD media, an HD-DVD media, a Blu-ray media, and the like. The removable recording medium 927 may be a Compact Flash (CF) (registered trademark), a memory stick, or a secure digital memory card (SD memory card). The removal recording medium 927 may also be an integrated circuit card (IC card) or an electronic device on which a non-contact type IC chip is mounted.

The connection port 923 is a port for directly connecting a device to the input device 10. One example of the connection port 923 is an universal serial bus (USB) port, an IEEE1394 port such as an i.Link port, a small computer system interface (SCSI) port and the like. Another example of the connection port 923 is an RS-232C port, an optical audio terminal, and a high-definition multimedia interface (HDMI) port. The input device 10 can acquire various types of data directly from the external connection device 929 or provide various types of data to the external connection device 929 by connecting the external connection device 929 to the connection port 923.

The communication device 925 is a communication interface configured by a communication device and the like for connecting to a communication network 931. The communication device 925 is, for example, a wired or wireless LAN (Local Area Network), a Bluetooth, or a wireless USB (WUSB) communication card. The communication device 925 may be an optical communication router, an asymmetric digital subscriber line (ADSL) router, or various communication modem. The communication device 925 can transmit and receive signals according to a predetermined protocol such as TCP/IP to and from the Internet and other communication devices. The communication network 931 connected to the communication device 925 is configured by a wired or wirelessly connected network etc. and includes Internet, home LAN, infrared data communication, radio wave communication, and satellite communication.

One example of a hardware configuration capable of realizing the functions of the input device 10 according to each embodiment of the present invention has been described above. Each configuring elements may be configured using a general-purpose member, or may be configured by hardware specialized to the function of each configuring element. Therefore, the hardware configuration to use can be appropriately changed according to the technical level at the time of implementing the present embodiment.

The hardware configuration of the information processing devices 20, 30, 40 according to each embodiment of the present invention is a configuration similar to the hardware configuration of the input device 10 according to each embodiment of the present invention and has substantially the same effects, thus the detailed description will be omitted.

Summary

As described above, in the vein authentication system according to each embodiment of the present invention, the system is parallelized not only in the direction of number of jobs (authentication by feature quantity, thumbnail authentication, template authentication) of the vein authentication process but also in the direction of number of registered data (i.e., number of registered people) of the database. In other words, in the present vein authentication system, the system is layered in the direction of number of jobs, and the information processing device belonging to each layer is parallelized in the direction of number of registered data.

Furthermore, in the vein authentication system according to each embodiment of the present invention, the jobs can be equally distributed to the information processing devices belonging to the layer by providing a queue between the layers.

The number of information processing devices belonging to each layer is set based on the time for the process in each layer and the number of registered data, for which each information processing device is responsible, so that the waste time in the pipeline method can be minimized.

Therefore, since the vein authentication process is parallelized not only in the direction of number of jobs but also in the direction of number of registered data in the vein authentication system according to each embodiment of the present invention, the authentication time can be shortened even if plural inputs are made at the same time.

It should be understood by those skilled in the art that various modifications, combinations, sub-combinations and alterations may occur depending on design requirements and other factors insofar as they are within the scope of the appended claims or the equivalents thereof.

For instance, in the above-described embodiment, a case in which the process related to the vein authentication is sectionalized to three stages of the authentication by feature quantity, the authentication using thumbnail image, and the authentication using template image is described, but may be sectionalized to two stages or may be sectionalized to four stages or more.

Furthermore, in the above-described embodiment, the vein authentication has been described by way of example, but each embodiment of the present invention is not limited to vein authentication and is applicable to various other biometric authentications.

Moreover, in the above-described embodiment, a case of performing a so-called grid computing using plural information processing devices has been described, but the biometric authentication system according to each embodiment of the present invention may be built using one or plural multi-core CPU. In other words, the biometric authentication system according to each embodiment of the present invention can be realized by assigning one part of the plural processor cores of the multi-core CPU to the processes in the respective layers.

The present application contains subject matter related to that disclosed in Japanese Priority Patent Application JP 2008-320221 filed in the Japan Patent Office on 16 Dec., 2008, the entire content of which is hereby incorporated by reference.

What is claimed is:
1. A biometric authentication system, comprising:
a plurality of information processing devices for performing authentication using biological information corresponding to a biological pattern representing physical features of a user, wherein
the plurality of information processing devices is divided into,
  a first group for performing a primary authentication based on feature quantity information unique to the biological pattern representing the physical features of the user associated with the biological information, and specifying an identification number assigned to the user, and
  a second group for performing a secondary authentication on the biological information that succeeded in the primary authentication based on the identification number and registered biological information registered in advance;
the input biological information is transmitted to all the information processing devices belonging to the first group;
the biological information that succeeded in the primary authentication is added as queuing information to a queue waiting for the start of the secondary authentication; and
each of the information processing devices belonging to the second group acquires the queuing information positioned at a head of the queue and executes a secondary authentication process when the secondary authentication process being executed in the own device is terminated.

2. The biometric authentication system according to claim 1, wherein the second group is further divided into, a thumbnail authentication group for performing authentication on the biological information that succeeded in the primary authentication based on a thumbnail image of a registered biological pattern registered in advance, and a template authentication group for performing authentication on the biological information that succeeded in the thumbnail authentication based on a template, which is the registered biological pattern registered in advance; and the biological information that succeeded in the thumbnail authentication group is added as queuing information to a queue waiting for the start of the authentication based on the template; and each of the information processing devices belonging to the template authentication group acquires the queuing information positioned at a head of the queue and executes an authentication process based on the template when the authentication process based on the template being executed in the own device is terminated.

3. The biometric authentication system according to claim 2, wherein number of information processing devices belonging to each group is determined so that a time for execution of the primary authentication in each information processing device belonging to the first group, a time for execution of the authentication based on the thumbnail image in each information processing device belonging to the thumbnail authentication group, and a time for execution of the authentication based on the template in each information processing device belonging to the template authentication group are equal to each other.

4. The biometric authentication system according to claim 3, wherein when number of users whose registered biological information is registered is N and number of information processing devices belonging to the first group is A, each information processing device belonging to the first group holds the registered biological information for (N/A) people different from each other.

5. The biometric authentication system according to claim 4, wherein when number of information processing devices belonging to the thumbnail authentication group is B, and number of information processing devices belonging to the template authentication group is C, a ratio of the number of information processing devices belonging to the first group and the number of information processing devices belonging to the thumbnail authentication group is set to satisfy equation 1, and a ratio of the number of information processing devices belonging to the thumbnail authentication group and the number of information processing devices belonging to the template authentication group is set to satisfy equation 2, $$\frac{A}{B} = \frac{N \cdot t_1}{N_2 \cdot t_2} \quad \text{(Equation 1)}$$

$$\frac{B}{C} = \frac{N_2 \cdot t_2}{N_3 \cdot t_3} \quad \text{(Equation 2)}$$

where in equation 1 and equation 2, $N_2$: number of biological information passing the information processing device belonging to the first group and becoming the queuing information;

$N_3$: number of biological information passing the information processing device belonging to the thumbnail authentication group and becoming the queuing information;

$t_1$: time for execution of the primary authentication in the information processing devices belonging to the first group;

$t_2$: time for execution of the authentication based on the thumbnail image in the information processing devices belonging to the thumbnail authentication group; and $t_3$: time for execution of the authentication based on the template in the information processing devices belonging to the template authentication group.

6. A biometric authentication method, comprising the steps of:

transmitting biological information input to a biometric authentication system, which includes a plurality of information processing devices for performing authentication using biological information or information corresponding to a biological pattern representing physical features of a user, the plurality of information processing devices being divided into a first group for performing the primary authentication based on feature quantity information unique to the biological pattern representing the physical features of the user associated with the biological information, and specifying an identification number assigned to the user, and a second group for performing a secondary authentication on the biological information that succeeded in the primary authentication based on the identification number and registered biological information registered in advance, to all the information processing devices belonging to the first group and performing the primary authentication;

having the information processing device belonging to the first group add the biological information that succeeded in the primary authentication as queuing information to a queue waiting for the start of the secondary authentication; and having each of the information processing devices belonging to the second group acquire the queuing information positioned at a head of the queue and execute a secondary authentication process when the secondary authentication process being executed in the own device is terminated.

* * * * *